(12) United States Patent
Wang et al.

(10) Patent No.: US 11,664,712 B2
(45) Date of Patent: May 30, 2023

(54) LINEAR VIBRATION MOTOR WITH AT LEAST COUPLE LINEAR MOVEMENT SUPPORT SHAFTS OF THE VIBRATOR

(71) Applicant: Goertek, Inc., Weifang (CN)

(72) Inventors: Guoyuan Wang, Weifang (CN); Hui Zhang, Weifang (CN); Juanjuan Cao, Weifang (CN); Yuanjiang Liu, Weifang (CN)

(73) Assignee: Goertek, Inc., Weifang (CN)

( * ) Notice: Subject to any disclaimer, the term of this patent is extended or adjusted under 35 U.S.C. 154(b) by 847 days.

(21) Appl. No.: 16/491,771

(22) PCT Filed: Apr. 10, 2017

(86) PCT No.: PCT/CN2017/079866
§ 371 (c)(1),
(2) Date: Sep. 6, 2019

(87) PCT Pub. No.: WO2018/166013
PCT Pub. Date: Sep. 20, 2018

(65) Prior Publication Data
US 2022/0255412 A1 Aug. 11, 2022

(30) Foreign Application Priority Data

Mar. 14, 2017 (CN) .......................... 201710151414.8

(51) Int. Cl.
*H02K 33/16* (2006.01)
(52) U.S. Cl.
CPC .................................. *H02K 33/16* (2013.01)

(58) Field of Classification Search
CPC ........ H02K 33/02; H02K 33/00; H02K 33/16; H02K 35/02; H02K 35/16; B06B 1/045
(Continued)

(56) References Cited

U.S. PATENT DOCUMENTS 4,363,980 A * 12/1982 Petersen ............... H01F 7/1615
310/15
6,323,568 B1 * 11/2001 Zabar ..................... H02K 33/04
310/12.24
(Continued)

FOREIGN PATENT DOCUMENTS

CN 1949640 A 4/2007
CN 201450439 U 5/2010
(Continued)

*Primary Examiner* — Maged M Almawri
(74) *Attorney, Agent, or Firm* — Baker Botts, LLP

(57) ABSTRACT

A linear vibration motor and an electronic device are provided. The linear vibration motor comprises: a magnetic conductive body; a vibrator comprising a permanent magnet; and a linear movement support, wherein the vibrator is mounted on the linear movement support to move along a linear movement path delimited by the linear movement support, wherein the magnetic conductive body is provided in a direction of the linear movement path near the vibrator for interacting with the permanent magnet, such that the vibrator tends towards a balanced position in the linear movement path in a non-activated state, wherein the magnetic conductive body is made of soft magnetic material, wherein the linear movement support comprises at least one guide shaft along which the vibrator can move axially, and wherein the magnetic conductive body is a magnetic conductive ring surrounding the vibrator.

7 Claims, 6 Drawing Sheets

(58) Field of Classification Search
 USPC ........ 310/25, 15, 12.01, 81, 80, 321, 20, 21, 310/28–30, 36–37, 40 MM
 See application file for complete search history.

(56) References Cited

U.S. PATENT DOCUMENTS

| | | | | |
|---|---|---|---|---|
| 7,671,493 B2* | 3/2010 | Takashima | .............. | G06F 3/016 |
| | | | | 310/15 |
| 7,768,160 B1* | 8/2010 | Sahyoun | ................ | H02K 33/16 |
| | | | | 310/23 |
| 8,013,480 B2* | 9/2011 | Bang | ....................... | B06B 1/045 |
| | | | | 310/12.33 |
| 8,278,786 B2* | 10/2012 | Woo | ....................... | H02K 33/16 |
| | | | | 310/15 |
| 8,368,268 B2* | 2/2013 | Hasegawa | ............ | G02B 21/248 |
| | | | | 359/381 |
| 8,648,502 B2* | 2/2014 | Park | ....................... | H02K 33/16 |
| | | | | 310/15 |
| 8,941,272 B2* | 1/2015 | Hong | ..................... | H02K 33/18 |
| | | | | 310/15 |
| 9,024,489 B2* | 5/2015 | Akanuma | ............. | H02K 33/16 |
| | | | | 310/15 |
| 9,225,265 B2* | 12/2015 | Oh | ......................... | H02N 2/001 |
| 9,306,429 B2* | 4/2016 | Akanuma | ............. | H02K 33/16 |
| 9,543,816 B2* | 1/2017 | Nakamura | ............ | H02K 33/16 |
| 9,619,981 B2* | 4/2017 | Chun | ..................... | H02K 33/16 |
| 9,748,827 B2* | 8/2017 | Dong | ..................... | H02K 33/16 |
| 9,762,111 B2 | 9/2017 | Shim et al. | | |
| 9,800,126 B2* | 10/2017 | Shim | ....................... | H02K 5/02 |
| 9,906,109 B2* | 2/2018 | Endo | ..................... | H02K 33/16 |
| 9,948,170 B2* | 4/2018 | Jun | ......................... | H02K 33/00 |
| 10,008,894 B2* | 6/2018 | Mao | ........................ | H02K 1/34 |
| 10,033,257 B2* | 7/2018 | Zhang | ................... | H02K 33/12 |
| 10,063,128 B2* | 8/2018 | Wang | .................... | H02K 33/16 |
| 10,160,010 B2* | 12/2018 | Chun | ..................... | H02K 33/16 |
| 10,307,791 B2* | 6/2019 | Xu | ........................... | B06B 1/045 |
| 10,328,461 B2* | 6/2019 | Xu | ........................... | B06B 1/045 |
| 10,411,575 B2* | 9/2019 | Takeda | .................... | H01F 7/088 |
| 10,447,133 B2* | 10/2019 | Jin | ......................... | H02K 33/18 |
| 10,483,451 B2* | 11/2019 | Wang | .................... | H01L 41/04 |
| 10,486,196 B2* | 11/2019 | Chai | ....................... | B06B 1/045 |
| 10,491,090 B2* | 11/2019 | Zu | ........................... | H02K 33/16 |
| 10,547,233 B2* | 1/2020 | Jin | ........................... | H02K 5/04 |
| 10,596,596 B2* | 3/2020 | Ling | ....................... | B06B 1/045 |
| 10,674,278 B2* | 6/2020 | Zhou | ..................... | H04R 9/025 |
| 10,763,732 B2* | 9/2020 | Liu | ......................... | H02K 33/16 |
| 10,886,827 B2* | 1/2021 | Liu | ......................... | H02K 33/14 |
| 11,050,334 B2* | 6/2021 | Mori | ..................... | H02K 33/18 |
| 11,309,808 B1* | 4/2022 | Li | ........................... | H02K 35/02 |
| 2006/0066164 A1* | 3/2006 | Kim | ....................... | H02K 7/063 |
| | | | | 310/81 |
| 2007/0108850 A1* | 5/2007 | Chertok | ................ | H02K 33/16 |
| | | | | 310/15 |
| 2009/0146509 A1* | 6/2009 | Aoyagi | ................... | B06B 1/045 |
| | | | | 310/15 |
| 2009/0267423 A1* | 10/2009 | Kajiwara | ............... | H02K 33/02 |
| | | | | 310/38 |
| 2010/0066182 A1* | 3/2010 | Yamazaki | .............. | B06B 1/045 |
| | | | | 310/29 |
| 2010/0102646 A1* | 4/2010 | Masami | ................. | H02K 33/16 |
| | | | | 310/29 |
| 2010/0213773 A1* | 8/2010 | Dong | ..................... | H02K 33/16 |
| | | | | 310/25 |
| 2011/0018364 A1* | 1/2011 | Kim | ....................... | H02K 33/18 |
| | | | | 310/20 |
| 2011/0068640 A1* | 3/2011 | Choi | ....................... | H02K 5/04 |
| | | | | 310/25 |
| 2011/0089772 A1* | 4/2011 | Dong | ..................... | H02K 33/16 |
| | | | | 310/25 |
| 2011/0115311 A1* | 5/2011 | Dong | ..................... | H02K 33/16 |
| | | | | 310/28 |
| 2011/0133577 A1* | 6/2011 | Lee | ......................... | H02K 33/18 |
| | | | | 310/15 |
| 2011/0198949 A1* | 8/2011 | Furuich | ................. | H02K 33/16 |
| | | | | 310/25 |
| 2011/0316361 A1* | 12/2011 | Park | ....................... | H02K 33/16 |
| | | | | 310/25 |
| 2012/0153748 A1* | 6/2012 | Wauke | .................. | H02K 33/16 |
| | | | | 310/25 |
| 2012/0187780 A1* | 7/2012 | Bang | ..................... | H02K 33/16 |
| | | | | 310/25 |
| 2012/0313459 A1* | 12/2012 | Zhang | ................... | H02K 33/18 |
| | | | | 310/25 |
| 2012/0319506 A1* | 12/2012 | Shim | ..................... | H02K 33/16 |
| | | | | 310/25 |
| 2013/0099600 A1* | 4/2013 | Park | ....................... | B06B 1/045 |
| | | | | 310/15 |
| 2013/0119787 A1* | 5/2013 | Yu | ........................... | B06B 1/045 |
| | | | | 310/25 |
| 2013/0169071 A1* | 7/2013 | Endo | ..................... | H02K 33/12 |
| | | | | 310/25 |
| 2013/0342037 A1* | 12/2013 | Kawarai | ................ | H02K 35/02 |
| | | | | 310/30 |
| 2014/0035397 A1* | 2/2014 | Endo | ..................... | H02K 33/16 |
| | | | | 310/30 |
| 2014/0062225 A1* | 3/2014 | Kim | ....................... | H02K 33/00 |
| | | | | 310/15 |
| 2014/0103751 A1* | 4/2014 | Furukawa | ............. | H02K 35/02 |
| | | | | 310/25 |
| 2014/0232211 A1* | 8/2014 | Katada | ................... | H02K 33/16 |
| | | | | 310/25 |
| 2015/0137628 A1* | 5/2015 | Endo | ..................... | H02K 33/16 |
| | | | | 310/25 |
| 2016/0164389 A1* | 6/2016 | Jang | ...................... | H02K 7/116 |
| | | | | 310/20 |
| 2016/0173990 A1* | 6/2016 | Park | ....................... | H04R 9/043 |
| | | | | 381/354 |
| 2017/0033657 A1* | 2/2017 | Mao | ...................... | H02K 33/16 |
| 2017/0033673 A1* | 2/2017 | Wang | .................... | H02K 33/16 |
| 2017/0110920 A1* | 4/2017 | Mao | ...................... | H02K 1/34 |
| 2017/0110952 A1* | 4/2017 | Takeda | .................. | H02K 33/02 |
| 2017/0214307 A1* | 7/2017 | Katada | .................. | B06B 1/045 |
| 2017/0279343 A1* | 9/2017 | Katada | .................. | H02K 5/16 |
| 2017/0288519 A1* | 10/2017 | Kim | ....................... | H02K 33/00 |
| 2017/0288523 A1* | 10/2017 | Katada | .................. | H02P 25/032 |
| 2018/0021812 A1* | 1/2018 | Akanuma | ............. | H02K 33/00 |
| | | | | 310/25 |
| 2018/0212487 A1* | 7/2018 | Jiang | .................... | H02K 33/16 |
| 2018/0250107 A1* | 9/2018 | Dai | ....................... | H02K 1/2786 |
| 2018/0278136 A1* | 9/2018 | Odajima | ............... | H02K 33/16 |
| 2019/0044425 A1* | 2/2019 | Zu | ......................... | H02K 33/18 |
| 2019/0151895 A1* | 5/2019 | Takahashi | ............ | H02K 33/18 |
| 2020/0044542 A1* | 2/2020 | Wang | .................... | H02K 33/18 |

FOREIGN PATENT DOCUMENTS

| | | | |
|---|---|---|---|
| CN | 105305762 A | 2/2016 | |
| CN | 105556814 A | 5/2016 | |
| CN | 110087782 A * | 8/2019 | .............. B06B 1/04 |
| WO | WO-2016017585 A1 * | 2/2016 | .............. B06B 1/045 |
| WO | WO-2017018442 A1 * | 2/2017 | .............. B06B 1/045 |
| WO | WO-2017194239 A1 * | 11/2017 | .............. B06B 1/045 |

* cited by examiner

LINEAR VIBRATION MOTOR WITH AT LEAST COUPLE LINEAR MOVEMENT SUPPORT SHAFTS OF THE VIBRATOR

CROSS-REFERENCE TO RELATED APPLICATIONS

This application is a National Stage of International Application No. PCT/CN2017/079866, filed on Apr. 10, 2017, which claims priority to Chinese Patent Application No. 201710151414.8, filed on Mar. 14, 2017, both of which are hereby incorporated by reference in their entireties.

TECHNICAL FIELD

The present disclosure relates to the technical field of motor, and in particular, to a linear vibration motor and an electronic device.

BACKGROUND

At present, more and more electronic devices adopt a vibration motor. For example, portable consumer electronic devices such as a mobile phone, a wearable device, a game machine and the like can adopt the vibration motor as a feedback of a system. For example, the vibration motor can be used as a vibration indication for the mobile phone, or can be used to provide a gaming tactility for the game machine, etc.

A linear vibration motor has many advantages compared to a traditional rotary vibration motor with an eccentric gear. For example, the linear vibration motor doesn't need a commutator and a brush, therefore electric sparks generated by friction would not occur in the linear vibration motor during operation. The linear vibration motor adopts a reliable operation and fast response. Thus, the linear vibration motor is widely applicable.

In the prior art, a spring part is typically used as a support element in the linear vibration motor, so as to transmit the vibration of the mass block. The manufacturing, strength and life of the spring part would restrict the application of the linear vibration motor.

FIG. 1 shows a linear vibration motor of the prior art. As shown in FIG. 1, the linear vibration motor comprises a spring part 11, an upper housing 12, a permanent magnet 13, a magnet yoke 14, a mass block 15, a coil 16, a base 17 and a flexible circuit 18. The permanent magnet 13, the mass block 15 and the magnet yoke 14 constitute a vibrator. The permanent magnet 13 and the mass block 15 are fixed together by the magnet yoke 14. The spring part 11 is used for supporting the vibrator. The coil 16 when powered on generates a force to move the vibrator.

In the typical linear vibration motor, a clearance is needed for the mass block to vibrate upwards and downwards, so as to prevent the mechanical spring part from getting into contact with the upper housing and the base during the operation. This causes the mass block to have a low weight and a low performance.

In addition, the spring part is easy to be deformed when being laser welded. As the spring part is sensitive to flatness, it is difficult to shape the spring part. When the spring part is bent undesirably, a trailing end of the spring part is easy to turn upwards and hence to collide with an object, resulting in noise.

In addition, the deformed spring part would cause the spring element in the motor to rub internally to generate heat, thereby reducing the life of the spring element. Moreover, this would result in noise.

In addition, the spring part is a stressed part and acted upon by alternating stresses. Therefore, the spring part can be broken over time. The life of the spring part usually would have an impact on the life of the linear vibration motor.

China patent application CN201620087447.1 discloses a linear vibration motor, which is incorporated herein by reference in its entirety.

Therefore, there is a need to provide a new technical solution of the linear vibration motor to resolve at least one technical problem in the prior art.

SUMMARY

One object of the present disclosure is to provide a new technical solution of a linear vibration motor.

According to one aspect of the disclosure, there is provided a linear vibration motor, a magnetic conductive body; a vibrator comprising a permanent magnet; and a linear movement support, wherein the vibrator is mounted on the linear movement support to move along a linear movement path delimited by the linear movement support, wherein the magnetic conductive body is provided in a direction of the linear movement path near the vibrator for interacting with the permanent magnet, such that the vibrator tends towards a balanced position in the linear movement path in a non-activated state, and wherein the magnetic conductive body is made of soft magnetic material.

Optionally or alternatively, the linear movement support comprises at least two guide shafts, the permanent magnet is a ring shaped permanent magnet, and the ring shaped permanent magnet can move axially along the guide shafts; and the magnetic conductive body is a magnetic core passing through a center of the ring shaped permanent magnet.

Optionally or alternatively, the vibrator further comprises a ring shaped mass block, the ring shaped permanent magnet and the ring shaped mass block being fixed together, and the guide shafts passing through the ring shaped mass block longitudinally.

Optionally or alternatively, the linear movement support comprises at least one guide shaft along which the vibrator can move axially, and the magnetic conductive body is a magnetic conductive ring surrounding the vibrator.

Optionally or alternatively, the linear movement support comprises one guide shaft and the permanent magnet is a ring shaped permanent magnet, wherein the guide shaft is centered in the ring shaped mass block, the permanent magnet and the ring shaped mass block are fixed together, and the ring permanent magnet and the ring shaped mass block are concentric.

Optionally or alternatively, the vibrator further comprises sleeves to be matched with the guide shaft(s).

Optionally or alternatively, the linear vibration motor further comprises control coils positioned at both ends of the magnetic conductive body respectively, wherein the control coils when powered on generate an electromagnetic field, to control the vibrator to move along the linear movement path.

Optionally or alternatively, the linear vibration motor further comprises an upper housing and a base, wherein the linear movement support and the magnetic conductive body are fixed in the upper housing and the base.

Optionally or alternatively, an anti-collision portion is provided between the vibrator and at least one of the upper housing and the base, to prevent the vibrator from getting into contact with the at least one of the upper housing and the base, and wherein the anti-collision portion is made of a material capable of absorbing collision.

According to a further aspect of the disclosure, there is provided an electronic device, comprising a linear vibration motor according to the present embodiments.

According to the embodiments of the present disclosure, instead of the mechanical spring, the permanent magnet and the magnetic conductive body are used to provide a magnetic action functioned as a spring to the linear vibration motor.

Further features of the present disclosure and advantages thereof will become apparent from the following detailed description of exemplary embodiments according to the present disclosure with reference to the following drawings.

BRIEF DESCRIPTION OF THE DRAWINGS

The accompanying drawings, which constitute a part of the specification, illustrate embodiments of the disclosure and, together with the description thereof, serve to explain the principles of the disclosure.

DETAILED DESCRIPTION

Figure 1:
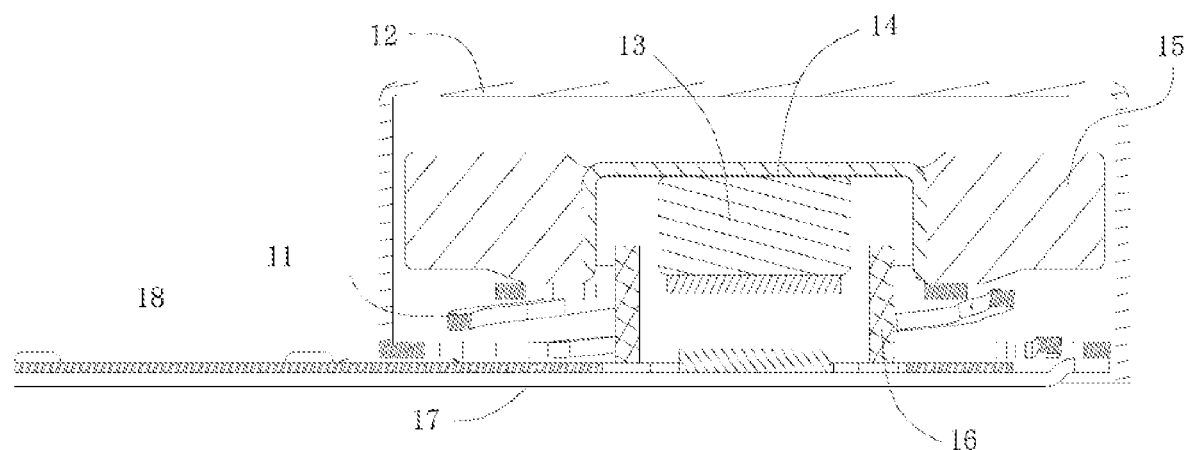
FIG. 1 shows a schematic diagram of a linear vibration motor of the prior art.

Various exemplary embodiments of the disclosure now will be described in detail by reference to the drawings. It should be noted that the relative arrangements of components and steps, the numerical expressions and the numerical values set forth in the embodiments do not limit the scope of the disclosure unless it is otherwise stated.

The following description of at least one exemplary embodiment is merely illustrative in nature and is in no way intended to limit the disclosure, its application, or uses.

Techniques and apparatus as known by one of ordinary skilled persons in the relevant art may not be discussed in detail but are intended to be part of the specification where appropriate.

In all of the examples shown and discussed herein, any specific value should be interpreted to be illustrative only and non-limiting. Thus, other examples of the exemplary embodiments could have different values.

Notice that similar reference numerals and letters refer to similar items in the following figures and thus once an item is defined in one figure, it is possible that it needs not to be further discussed in the following figures.

Various embodiments and examples are described below with reference to the accompanying drawings.

Figure 2:
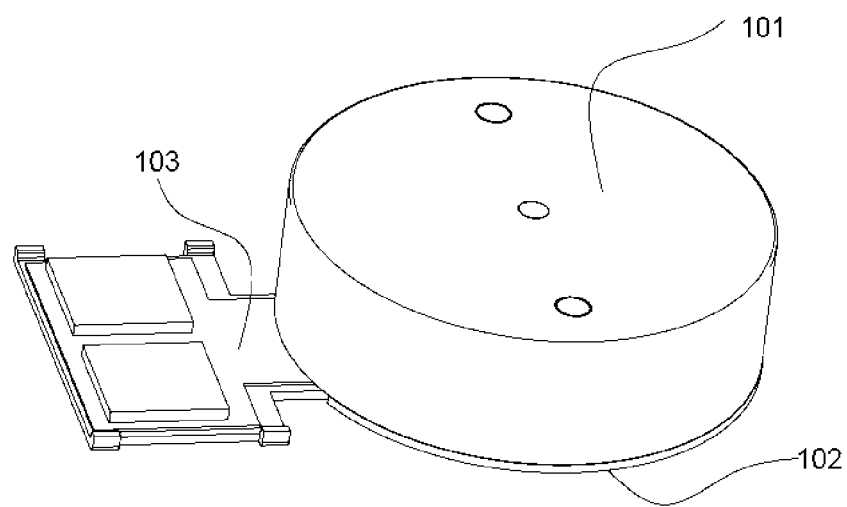
FIG. 2 shows a structural schematic diagram of a linear vibration motor according to a first embodiment.
Figure 3:
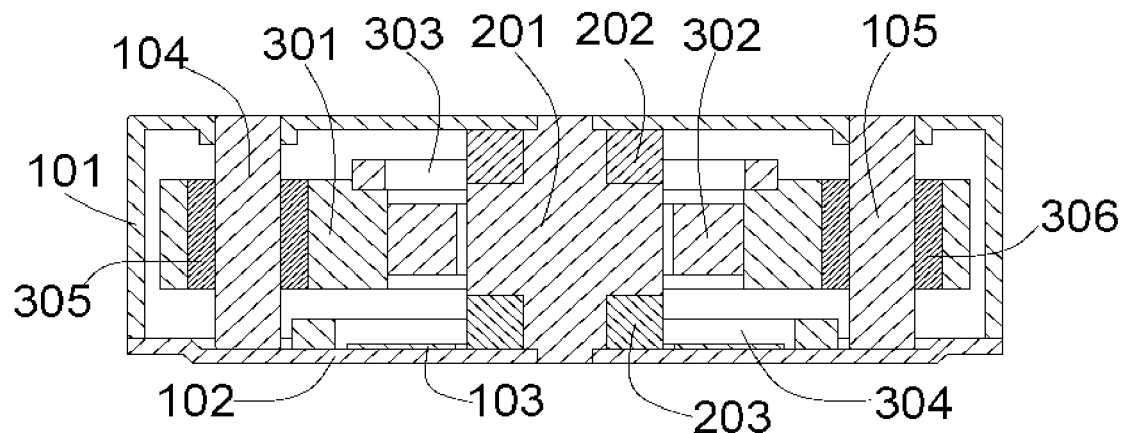
FIG. 3 shows a schematic section view of the linear vibration motor according to the first embodiment.
Figure 4:
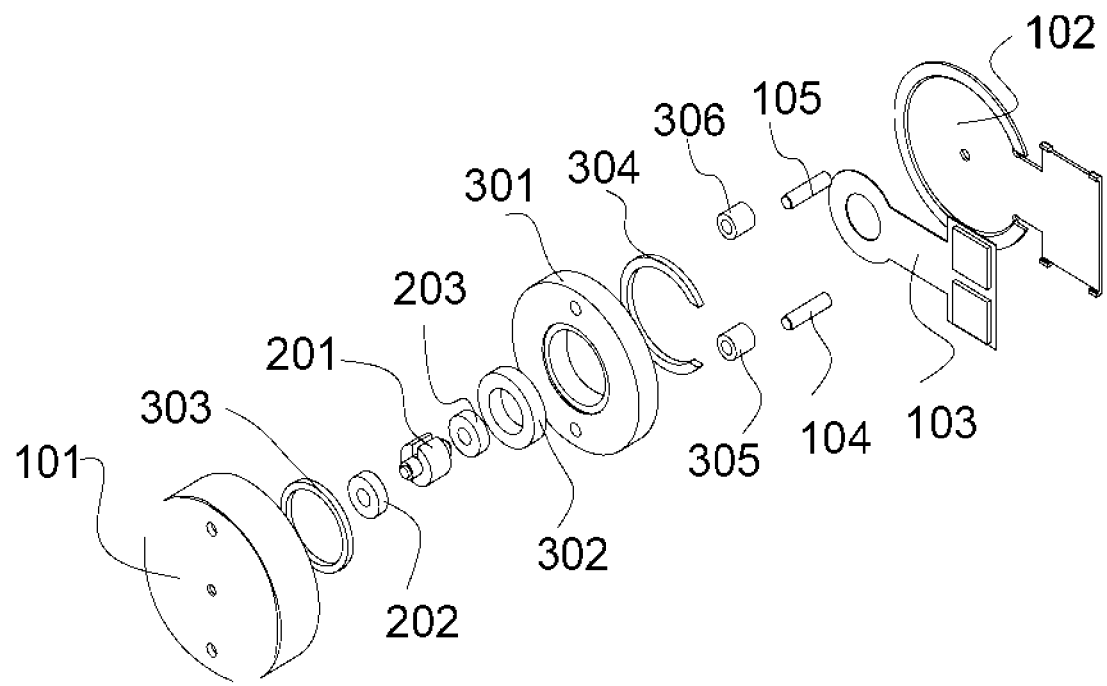
FIG. 4 shows a schematic exploded view of the linear vibration motor according to the first embodiment.

FIG. 2 shows a structural schematic diagram of a linear vibration motor according to a first embodiment. FIG. 3 shows a schematic section view of the linear vibration motor according to the first embodiment. FIG. 4 shows a schematic exploded view of the linear vibration motor according to the first embodiment.

As shown in FIG. 2, the linear vibration motor comprises an upper housing 101, a base 102 and a flexible circuit 103. The upper housing 101 and the base 102 are used for delimiting the shape and the internal space of linear vibration motor. The flexible circuit 103 is used for provide a control signal to the linear vibration motor. It should be understood by a person skilled in the art that the flexible circuit 103 is described herein, but other kinds of circuits, for example, a printed circuit and the like, can be used to provide the control signal to the linear vibration motor. In addition, for example, the upper housing 101 and the base 102 can be fixed together by welding and the like.

The linear vibration motor can comprise a magnetic conductive body 201, a vibrator 301, 302 and a linear movement support 104, 105.

The vibrator can comprise a permanent magnet 302. In addition, the vibrator can further comprise a mass block 301 as the same with the prior art.

The linear movement support 104, 105 can delimit a linear movement path (a linear movement track) for the vibrator to move along.

The vibrator 301, 302 is mounted on the linear movement support 104, 105, so as to move along the linear movement path delimited by the linear movement support. The linear movement support guides the movement of the vibrator and ensures the vibrator is not biased during operation.

The magnetic conductive body 201 is provided in a direction of the linear movement path near the vibrator for interacting with the permanent magnet, such that the vibrator tends towards a balanced position in the linear movement path in a non-activated state. The magnetic conductive body 201 is made of soft magnetic material.

The non-activated state here is opposite to a vibration state when the coil of the linear vibration motor is powered on. For example, in the non-activated state, the vibrator can be active or stationary. The term "tends towards" refers to the fact that the vibrator is in the balanced position when the vibrator is stationary, and moves to the balanced position when the vibrator is active due to the interaction between the magnetic conductive body and the permanent magnet.

The soft magnetic material here can provide a sufficient support to the vibrator in the non-activated state, such that the vibrator is located in the balanced position in the linear movement path. The soft magnetic material can as well facilitate the coil to generate a magnetic field when the coil of the linear vibration motor is powered on, so as to generate a driving force for the vibrator. The soft magnetic material here refers to a material with the above-mentioned properties. In addition, the soft magnetic material can further be defined by the coercivity. For example, the soft magnetic material can be a magnetic material with a coercivity less than 12.5 Oe in some cases. For example, the soft magnetic material can be iron, ferrite, or the like.

The soft magnetic material can be magnetized by the permanent magnet, so as to interact with the permanent magnet for stabilizing the vibrator in the balanced position.

The permanent magnet here refers to a magnetic material capable of retaining its magnetism in normal conditions for use. For example, the permanent magnet can be a magnetic material with a coercivity more than 125 Oe in some cases.

It should be understood by the person skilled in the art that as the linear vibration motor can be in different postures (a horizontal posture, a vertical posture, etc.), thus the balanced position in the non-activated state can be offset due to gravity.

In this example, the interaction between the magnetic conductive body and the permanent magnet in the vibrator can achieve the effect realized by a linear spring (a magnetic spring).

For example, when the vibrator is driven, it can return to the balanced position by means of the magnetic spring instead of an extra return spring.

In addition, no mechanical spring is needed in the linear vibration motor. Therefore, no mechanical loss would occur.

In addition, no spring part is needed in the linear vibration motor. The manufacturing of the linear vibration motor can be simplified.

In addition, the impact of the spring part on the linear vibration motor can be eliminated.

In the first embodiment, the linear vibration motor further comprises control coils 202, 203 positioned at both ends of the magnetic conductive body respectively. The powered control coils 202, 203 generate an electromagnetic field, so as to control the vibrator to move along the linear movement path. The two coils provided here can provide a larger vibration driving force to the vibrator.

The linear vibration motor can further comprise the upper housing 101 and the base 102. The linear movement support 104, 105 and the magnetic conductive body 201 are fixed in the upper housing 101 and the base 102.

For example, an anti-collision portion 303, 304 is provided between the vibrator 301, 302 and at least one of the upper housing 101 and the base 102, to prevent the vibrator 301, 302 from getting into contact with at least one of the upper housing 101 and base 102, wherein the anti-collision portion is made of a material capable of absorbing collision.

In the first embodiment, the permanent magnet is a ring shaped permanent magnet 302, and the magnetic conductive body is a magnetic core 201 passing through a center of the ring shaped permanent magnet. The linear movement support here comprises at least two guide shafts, and the ring shaped permanent magnet can move axially along the guide shafts. The term ring here refers to a hollow shape, which can have an outer periphery and an inner periphery in the shape of round and in other shapes. Moreover, the shapes of the outer periphery and the inner periphery of the ring can be the same or different. Preferably, both of the shapes of the outer periphery and the inner periphery of the ring can be round.

For example, the vibrator further comprises sleeves 305, 306 to be matched with the guide shafts.

For example, the vibrator further comprises a ring shaped mass block 301. The ring shaped permanent magnet 302 and the ring shaped mass block 301 are fixed together, and the guide shafts 104, 105 pass through the ring shaped mass block longitudinally. For example, the ring shaped permanent magnet 302 and the ring shaped mass block 302 can be fixed together by an adhesive or the like.

As shown in FIG. 3 and FIG. 4, the linear vibration motor comprises the upper housing 101, the base 102, the flexible circuit 103, the two guide shafts 104, 105, the magnetic core 201, the coils 202, 203, the ring shaped mass block 301, the ring shaped permanent magnet 302, the anti-collision portions 303, 304, and the sleeves 305, 306.

The coils 202, 203 are positioned at both ends of the magnetic core 201 respectively. The ring shaped mass block 301 and the ring shaped permanent magnet 302 constitute the vibrator.

When the coils 202, 203 are powered on, the permanent magnet 302 and the coils 202, 203 generate an electromagnetic force to move the vibrator along the guide shafts 104, 105. As the magnetic core 201 is made of soft magnetic material, the magnetic core 201 can facilitate the coils to generate a magnetic field when the coils 202, 203 are powered on.

The magnetic core 201 and the permanent magnet 302 can generate a magnetic attractive force to one another. When the vibrator is in a reciprocating motion, the magnetic attractive force can be functioned as a spring. The interaction between the magnetic core 201 and permanent magnet 302 can be used to store and release energy, maintaining the continuous movement of the vibrator.

The anti-collision portion 304 can be provided on an inner surface of the base 102, to prevent the vibrator from getting into contact with the base 102 during the linear vibration of the vibrator.

The anti-collision portion 303 can be provided on an upper surface of the ring shaped mass block 301, to prevent the vibrator from getting into contact with the upper housing 101 during the linear vibration of the vibrator.

For example, the anti-collision portions 303, 304 can be made of elastic material. They can be used to prevent the vibrator from getting into contact with the upper housing 101 or the base 102 due to an excessive vibration of the vibrator. For example, the anti-collision portions can be used to prevent noise due to the contact. In addition, the anti-collision portions can reduce wear on the vibrator due to the contact.

For example, the anti-collision portions 303, 304 can be made of materials such as rubber, cork, polypropylene, etc. The anti-collision portions 303, 304 can absorb an external collision when happening. It should be understood by the person skilled in the art that the anti-collision portions 303, 304 can be made of not only the above-mentioned materials, but also any materials capable of absorbing collision.

The ring shaped mass block 301 has guide holes to be match with the sleeves 305, 306. The guide shafts 104, 105 are in clearance fit with the sleeves 305, 306.

For example, the ring shaped mass block 301 can be made of tungsten steel with high density to increase the weight of the vibrator, so as to obtain a high level of vibration. According to design requirements, the mass block can be made of other materials.

For example, the ring shaped permanent magnet 302 can be positioned at an inner periphery of the ring shaped mass block 301, so as to face the magnetic core 201. For example, upper and lower surfaces of the ring shaped permanent magnet 302 is equidistantly spaced apart from upper and lower surfaces of the ring shaped mass block 301 respectively, such that the ring shaped permanent magnet 302 is in the middle of the ring shaped mass block 301.

Figure 5:
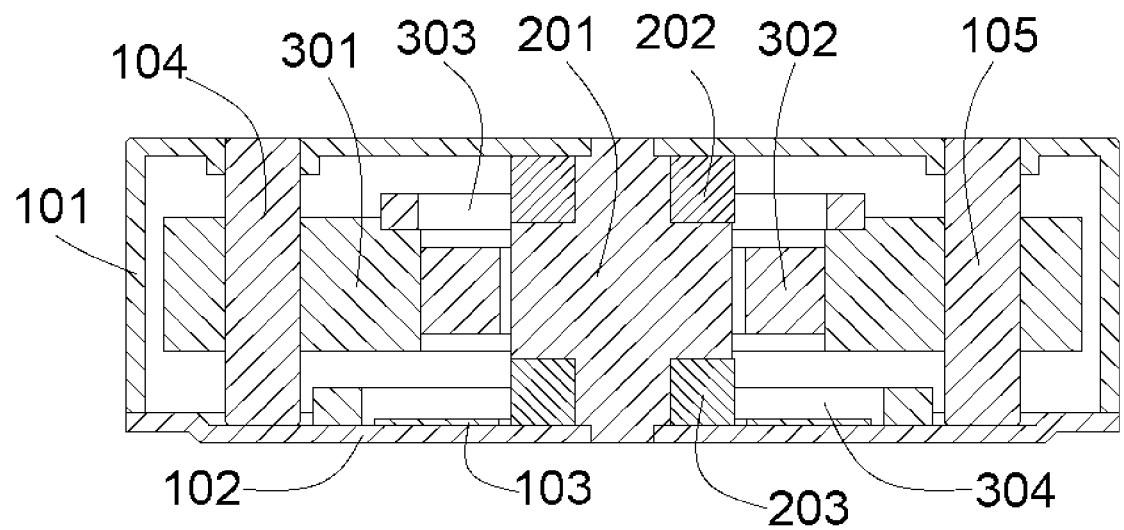
FIG. 5 shows a schematic section view of a linear vibration motor according to a second embodiment.
Figure 6:
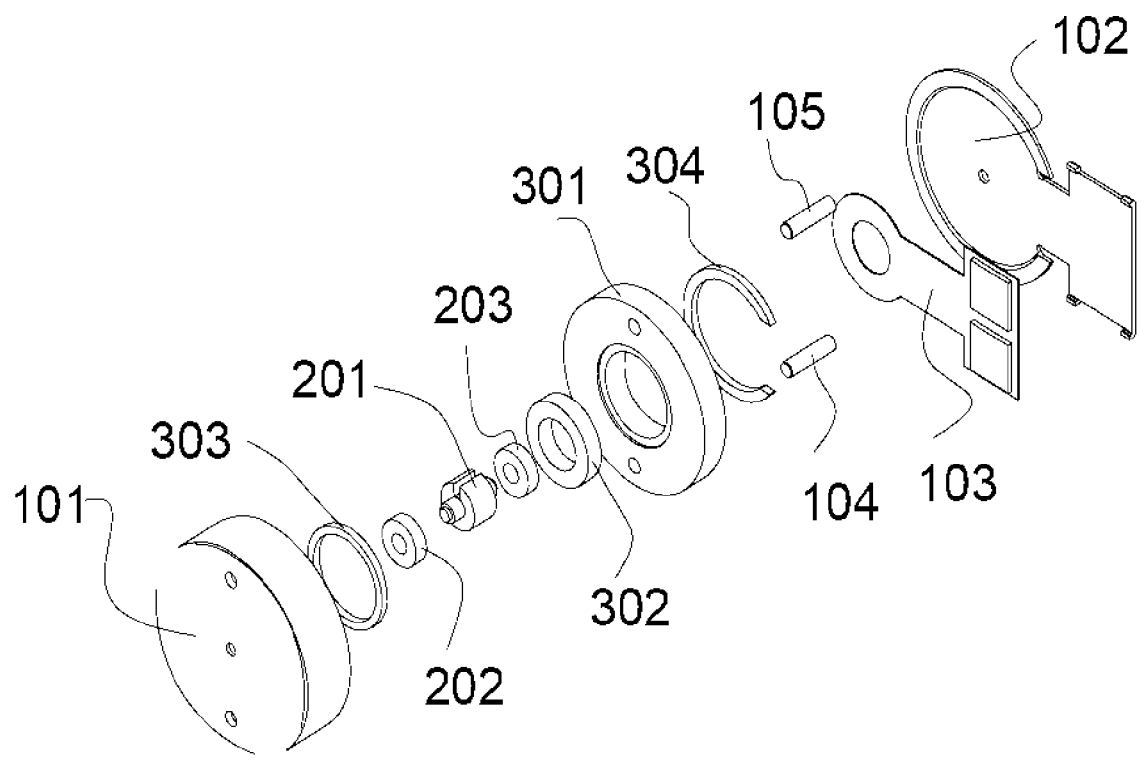
FIG. 6 shows a schematic exploded view of the linear vibration motor according to the second embodiment.

FIG. 5 shows a schematic section view of a linear vibration motor according to a second embodiment. FIG. 6 shows a schematic exploded view of the linear vibration motor according to the second embodiment.

The second embodiment is different from the first embodiment in that the sleeves 305, 306 are omitted in the second embodiment. Other components in the second embodiment are the same as their corresponding components in the first embodiment and thus the description thereof is omitted.

Figure 7:
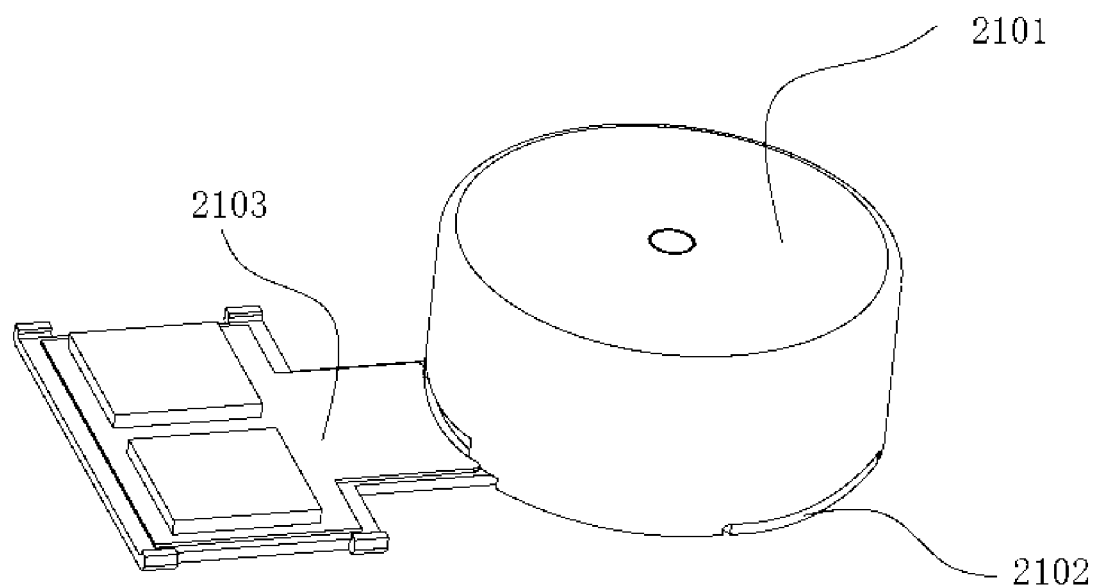
FIG. 7 shows a structural schematic diagram of a linear vibration motor according to a third embodiment.
Figure 8:
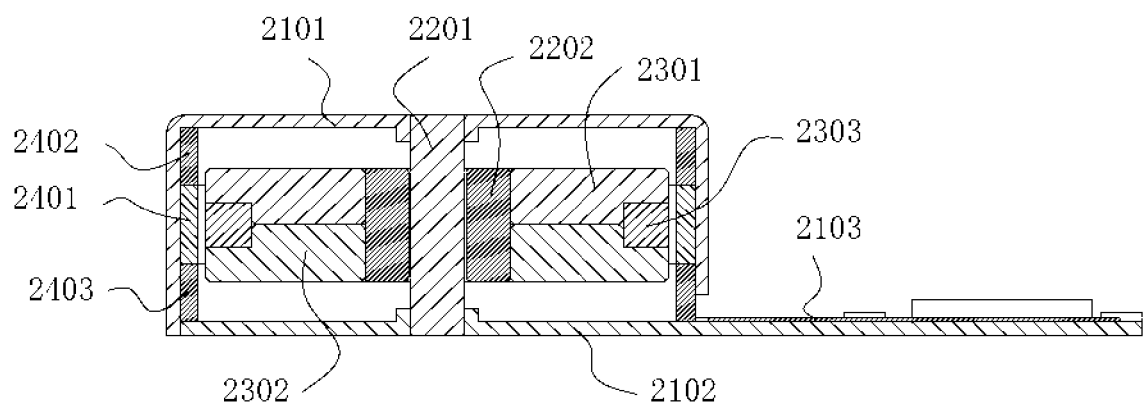
FIG. 8 shows a schematic section view of the linear vibration motor according to the third embodiment.
Figure 9:
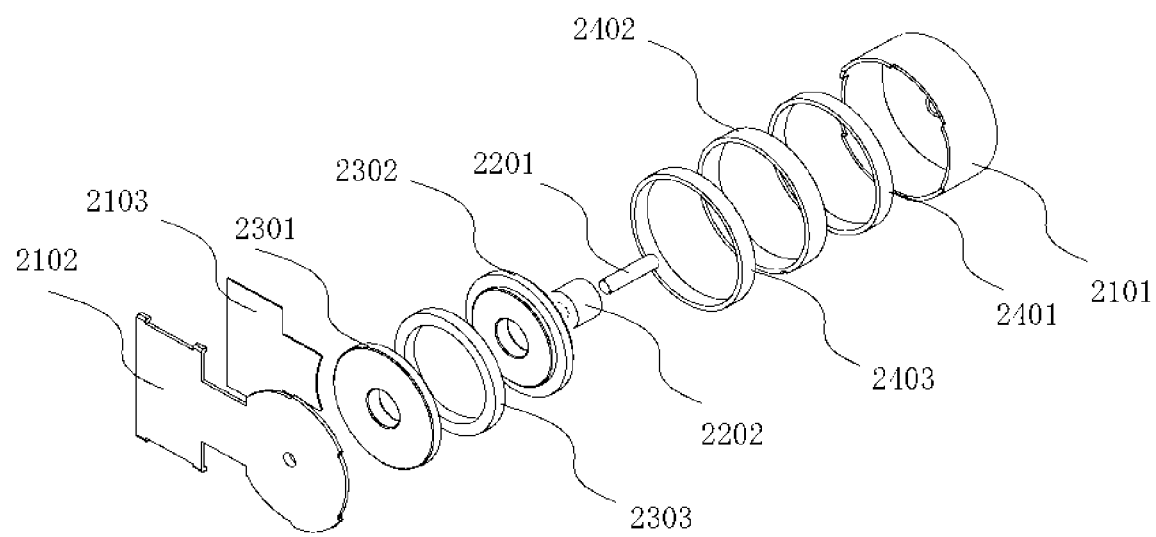
FIG. 9 shows a schematic exploded view of the linear vibration motor according to the third embodiment.

FIG. 7 shows a structural schematic diagram of a linear vibration motor according to a third embodiment. FIG. 8 shows a schematic section view of the linear vibration motor according to the third embodiment. FIG. 9 shows a schematic exploded view of the linear vibration motor according to the third embodiment.

In the third embodiment, the linear movement support comprises at least one guide shaft. The vibrator can move axially along the guide shaft, wherein the magnetic conductive body is a magnetic conductive ring surrounding the vibrator.

For example, the linear movement support comprises one guide shaft, the vibrator comprises a ring shaped mass block, and the permanent magnet is a ring shaped permanent magnet. The guide shaft is centered in the ring shaped mass block, the permanent magnet and the ring shaped mass block are fixed together, and the ring shaped permanent magnet and the ring shaped mass block are concentric.

The third embodiment is detailed with reference to FIGS. 7-9 below. The description of components in the third embodiment corresponding to those in the first embodiment can be omitted.

As shown in FIG. 7, the linear vibration motor comprises an upper housing 2101, a base 2102 and a flexible circuit 2103.

As shown in FIGS. 8 and 9, the linear vibration motor comprises the upper housing 2101, the base 2102, the flexible circuit 2103, one guide shaft 2201, a sleeve 2202, an upper ring shaped mass block 2301, a lower ring shaped mass block 2302, a ring shaped permanent magnet 2303, a magnetic conductive body 2401, and coils 2402, 2403, The guide shaft 2201 is matched with the sleeve 2202 in such a way that the vibrator can move along the guide shaft. The ring shaped permanent magnet 2303 is interposed between the upper ring shaped mass block 2301 and the lower ring shaped mass block 2302, and such constituted vibrator can move (vibrate) upwards and downwards along the guide shaft 2201. As shown in FIG. 8, the ring shaped permanent magnet 2303 can be disposed as an outer portion of the vibrator, so as to be opposed to the magnetic conductive body 2401. The magnetic conductive body 2401 can be the magnetic conductive ring.

An electromagnetic force is generated between the ring shaped permanent magnet 2303 and the coils 2402, 2403 to move the vibrator upwards and downwards along the guide shaft 2201.

A magnetic attractive force is generated between the magnetic conductive ring 2201 and ring shaped permanent magnet 2303, to function as a spring during the reciprocating motion of the vibrator. The spring can be functioned to store and release energy, maintaining the continuous movement of the vibrator.

For example, the magnetic conductive ring 2401 is configured to be matched to an inside wall of the upper housing 2101 at a middle position. The coil 2402 and the coil 2403 can have the same inner and outer diameters as the magnetic conductive ring 2401, and be positioned at the top and bottom of the magnetic conductive ring 2401 respectively. The coil 2402 and the coil 2403 can be connected with each other via a wire guide slot on the magnetic conductive ring.

The upper ring shaped mass block 2301 and the lower ring shaped mass block 2302 can constitute a ring shaped projection structure. The ring shaped permanent magnet 2303 can have the same outer diameter as the upper ring shaped mass block 2301 and the lower ring shaped mass block 2302.

The upper ring shaped mass block 2301, the lower ring shaped mass block 2302, and the ring shaped permanent magnet 2303 here have outer diameters less than inner diameters of the magnetic conductive ring 2401 and the coils 2402, 2403. Therefore, when the vibrator (the upper ring shaped mass block 2301, the lower ring shaped mass block 2302, the ring shaped permanent magnet 2303, and the sleeve 2202) moves, the vibrator is not contact with the magnetic conductive ring 2401 and the coils 2402, 2403.

The sleeve 202 is interposed between the vibrator and the guide shaft 2201, to ensure the vibrator move upwards and downwards along the guide shaft 2201.

Figure 10:
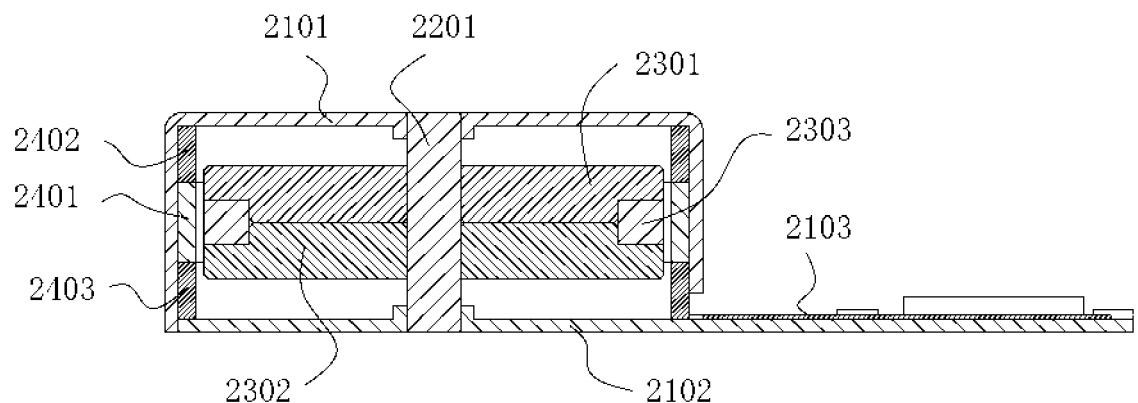
FIG. 10 shows a schematic section view of a linear vibration motor according to a fourth embodiment.
Figure 11:
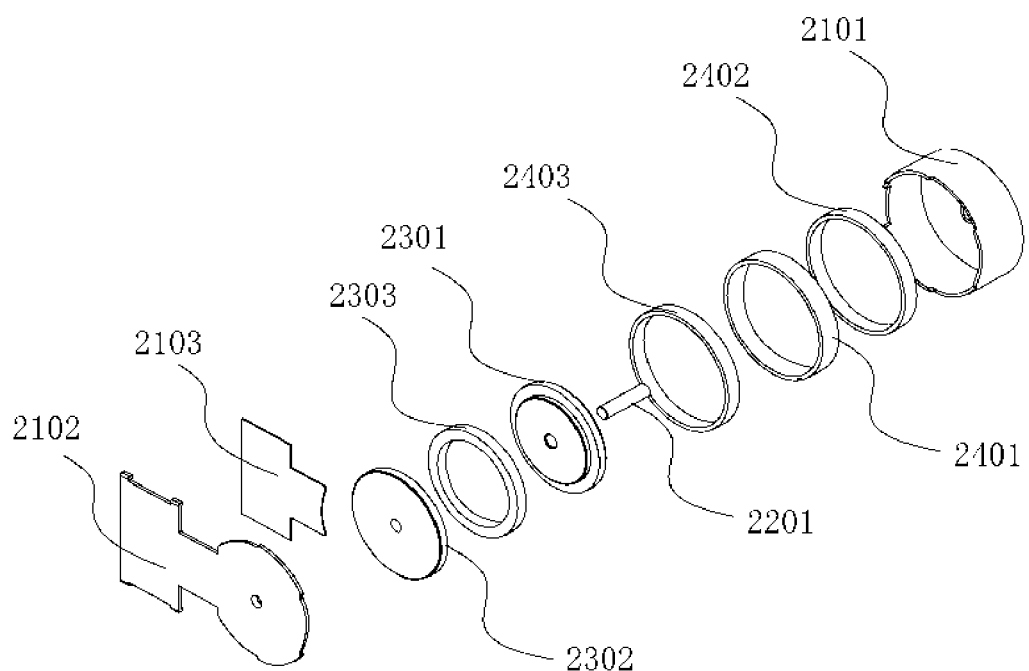
FIG. 11 shows a schematic exploded view of the linear vibration motor according to the fourth embodiment.

FIG. 10 shows a schematic section view of a linear vibration motor according to a fourth embodiment. FIG. 11 shows a schematic exploded view of the linear vibration motor according to the fourth embodiment.

The fourth embodiment is different from the third embodiment in that the sleeve 2202 is omitted in the fourth embodiment. Other components in the fourth embodiment can be the same as their corresponding components in the third embodiment and thus the description thereof is omitted.

In the embodiment, a "magnetic spring" functioning as a spring is formed by using the interaction between the permanent magnet and the magnetic conductive body. A magnetic attractive force is generated between the permanent magnet and the magnetic conductive body, to function as the spring during the reciprocating motion of the vibrator. The magnetic spring can store and release energy to maintain the continuous movement of the vibrator. Moreover, the vibrator can tend towards the balanced position in the linear movement path by using the magnetic spring. The mechanical spring and/or the spring part can be omitted here.

Further, in a linear vibration motor of the prior art, the mechanical spring and the spring part are easy to damaged due to a sudden collision, such as a fall. For example, the mechanical spring and the spring part can be displaced. In the embodiments of the present disclosure, as the interaction between the permanent magnet and the magnetic conductive body is used to function as the spring, the possibility of this kind of fault can be reduced.

Figure 12:
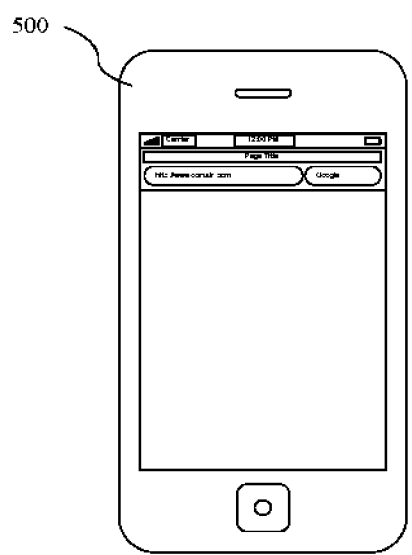
FIG. 12 shows a schematic diagram of an electronic device according to one embodiment.

FIG. 12 shows a schematic diagram of an electronic device according to one embodiment.

As shown in FIG. 12, the electronic device 500 can be a device such as a smart phone. The linear vibration motor according to the above-mentioned embodiments can be provided in the electronic device 500 to improve the vibration indication, the tactility, etc.

Although some specific embodiments of the present disclosure have been described in detail with reference to examples, the skilled persons in the art should understand that the above-mentioned examples are intended to be illustrative only and not to limit the scope of the present disclosure. It is understood in the art that the above embodiments may be modified without departing from the scope and spirit of the present disclosure. The scope of the present disclosure is defined by the attached claims.

The invention claimed is:
1. A linear vibration motor, comprising:
   a magnetic conductive body;
   a vibrator comprising a permanent magnet, and the permanent magnet is a ring shaped permanent magnet; and
   a linear movement support, wherein the vibrator is mounted on the linear movement support to move along a linear movement path delimited by the linear movement support, wherein the magnetic conductive body is provided in a direction of the linear movement path near the vibrator for interacting with the permanent magnet, such that the vibrator tends towards a balanced position in the linear movement path in a non-activated state, wherein control coils are positioned at both ends of the magnetic conductive body respectively, and the control coils when powered on generate an electromagnetic field to control the vibrator to move along the linear movement path, wherein the magnetic conductive body is made of soft magnetic material, wherein the linear movement support comprises at least one guide shaft along which the vibrator can move axially, wherein the magnetic conductive body is a magnetic conductive ring surrounding the vibrator, wherein the vibrator comprises a first ring shaped mass block, a second ring shaped mass block and the ring shaped permanent magnet, the first ring shaped mass block and the second ring shaped mass block are a ring shaped projection structure, a first recess and a second recess are formed on respective surfaces of the first ring shaped mass block and the second ring shaped mass block facing each other, the ring shaped permanent magnet is disposed in the first recess and the second recess, the ring shaped permanent magnet is disposed as an outer portion of the vibrator so as to be opposed to the magnetic conductive body, and wherein the ring shaped permanent magnet has the same outer diameter as the first ring shaped mass block and the second ring shaped mass block, the control coils and the magnetic conductive ring have the same inner diameter and outer diameter, and the outer diameter of the ring shaped permanent magnet is less than the inner diameter of the magnetic conductive ring.

2. The linear vibration motor according to claim 1, wherein the linear movement support comprises one guide shaft, and the vibrator comprises a ring shaped mass block, wherein the guide shaft is centered in the ring shaped mass block, the permanent magnet and the ring shaped mass block are fixed together, and the ring permanent magnet and the ring shaped mass block are concentric.

3. The linear vibration motor according to claim 1, wherein the vibrator further comprises a sleeve to be matched with the guide shaft.

4. An electronic device, comprising a linear vibration motor according to claim 1.

5. The linear vibration motor according to claim 1, further comprising an upper housing and a base, wherein the linear movement support and the magnetic conductive body are fixed in the upper housing and the base.

6. The linear vibration motor according to claim 5, wherein an anti-collision portion is provided between the vibrator and at least one of the upper housing and the base, to prevent the vibrator from getting into contact with the at least one of the upper housing and the base, and wherein the anti-collision portion is made of a material capable of absorbing collision.

7. The linear vibration motor according to claim 5, wherein the magnetic conductive ring is configured to be matched to an inside wall of the upper housing at a middle position, and leans against the upper housing.

\* \* \* \* \*